(12) United States Patent
Duvedi et al.

(10) Patent No.: US 12,380,000 B1
(45) Date of Patent: Aug. 5, 2025

(54) DATABASE TABLE RESTORATION FOR DATA WITH SKEWED DISTRIBUTION

(71) Applicant: Amazon Technologies, Inc., Seattle, WA (US)

(72) Inventors: Divyank Duvedi, Seattle, WA (US); Anurag Mishra, Redmond, WA (US); Chase Kernan, Seattle, WA (US); Richard Krog, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/108,779

(22) Filed: Dec. 1, 2020

(51) Int. Cl.
*G06F 11/14* (2006.01)
*G06F 16/22* (2019.01)
*G06F 16/27* (2019.01)

(52) U.S. Cl.
CPC ...... *G06F 11/1464* (2013.01); *G06F 11/1451* (2013.01); *G06F 11/1469* (2013.01); *G06F 16/2282* (2019.01); *G06F 16/278* (2019.01); *G06F 2201/80* (2013.01); *G06F 2201/84* (2013.01)

(58) Field of Classification Search
CPC ............ G06F 11/1464; G06F 16/2282; G06F 16/278; G06F 11/1451; G06F 11/1469; G06F 2201/80; G06F 2201/84
See application file for complete search history.

(56) References Cited

U.S. PATENT DOCUMENTS

| | | |
|---|---|---|
| 5,434,994 A | 7/1995 | Shaheen et al. |
| 5,574,878 A | 11/1996 | Onodera et al. |
| 6,463,509 B1 | 10/2002 | Teoman et al. |
| 7,502,960 B1 | 3/2009 | Todd et al. |
| 7,788,664 B1 | 8/2010 | Janakiraman et al. |
| 7,895,261 B2 | 2/2011 | Jones et al. |
| 7,975,102 B1 | 7/2011 | Hyer, Jr. et al. |

(Continued)

FOREIGN PATENT DOCUMENTS

| | | |
|---|---|---|
| AU | 2019262799 B2 | 12/2021 |
| CN | 112470112 A | 3/2021 |

(Continued)

OTHER PUBLICATIONS

"Amazon Simple Storage Service (S3) Guide," downloaded on Nov. 3, 2023 from http://docs.aws.amazon.com/AmazonS3/latest/dev/Welcome.html, 18 pages.

(Continued)

*Primary Examiner* — Tony Wu
(74) *Attorney, Agent, or Firm* — Davis Wright Tremaine LLP

(57) ABSTRACT

A database management system obtains key ranges associated with partitions of a database table, and determines that restoration of data associated with at least one of these partitions would take time that is estimated to exceed a goal time. The database management system splits a partition into two or more additional partitions, so that the respective estimated restoration times for data associated with the additional partitions is estimated to be less than the goal time. The database management system then causes the database table to be restored according to partitions that comprises the additional partitions.

20 Claims, 7 Drawing Sheets

(56) References Cited

U.S. PATENT DOCUMENTS

| | | |
|---|---|---|
| 8,280,853 B1 | 10/2012 | Lai et al. |
| 8,285,687 B2 | 10/2012 | Voll et al. |
| 8,538,926 B2 | 9/2013 | Barton et al. |
| 8,589,574 B1 | 11/2013 | Cormie et al. |
| 8,688,660 B1 | 4/2014 | Sivasubramanian et al. |
| 8,725,968 B2 | 5/2014 | Wada |
| 8,768,916 B1* | 7/2014 | Ghazal ............... G06F 16/2282 |
| | | 707/719 |
| 8,849,758 B1 | 9/2014 | Sivasubramanian et al. |
| 8,850,144 B1 | 9/2014 | Natanzon et al. |
| 9,003,227 B1 | 4/2015 | Patel et al. |
| 9,052,831 B1 | 6/2015 | Stefani et al. |
| 9,110,600 B1 | 8/2015 | Brooker et al. |
| 9,244,958 B1* | 1/2016 | MacCanti ............ G06F 16/273 |
| 9,246,996 B1 | 1/2016 | Brooker et al. |
| 9,503,517 B1 | 11/2016 | Brooker et al. |
| 9,563,385 B1 | 2/2017 | Kowalski et al. |
| 9,665,307 B1 | 5/2017 | LeCrone et al. |
| 9,720,620 B1 | 8/2017 | Wei et al. |
| 9,823,840 B1 | 11/2017 | Brooker et al. |
| 9,826,030 B1 | 11/2017 | Dhoolam et al. |
| 9,946,604 B1 | 4/2018 | Glass |
| 10,055,352 B2 | 8/2018 | Wei et al. |
| 10,423,348 B1 | 9/2019 | Messing et al. |
| 10,423,493 B1* | 9/2019 | Vig .................... G06F 11/3055 |
| 10,452,296 B1 | 10/2019 | Greenwood et al. |
| 10,459,655 B1 | 10/2019 | Greenwood et al. |
| 10,505,862 B1 | 12/2019 | Dhoolam et al. |
| 10,768,850 B2 | 9/2020 | Muniswamy-Reddy et al. |
| 10,931,750 B1 | 2/2021 | Labovich et al. |
| 10,956,442 B1 | 3/2021 | Labovich et al. |
| 10,983,719 B1 | 4/2021 | Williams et al. |
| 11,023,157 B2 | 6/2021 | Greenwood et al. |
| 11,068,192 B1 | 7/2021 | Greenwood et al. |
| 11,093,148 B1 | 8/2021 | Greenwood et al. |
| 11,182,095 B2 | 11/2021 | Greenwood et al. |
| 11,343,314 B1 | 5/2022 | Muniswamy-Reddy et al. |
| 2002/0059253 A1 | 5/2002 | Albazz et al. |
| 2002/0144070 A1 | 10/2002 | Watanabe et al. |
| 2003/0028737 A1 | 2/2003 | Kaiya et al. |
| 2003/0050974 A1 | 3/2003 | Mani-Meitav et al. |
| 2003/0191930 A1 | 10/2003 | Viljoen et al. |
| 2003/0204597 A1 | 10/2003 | Arakawa et al. |
| 2004/0078419 A1 | 4/2004 | Ferrari et al. |
| 2005/0148356 A1 | 7/2005 | Ferguson et al. |
| 2005/0193113 A1 | 9/2005 | Kokusho et al. |
| 2006/0080362 A1 | 4/2006 | Wagner et al. |
| 2006/0271530 A1 | 11/2006 | Bauer |
| 2007/0226436 A1 | 9/2007 | Cheng et al. |
| 2008/0086616 A1 | 4/2008 | Asano et al. |
| 2008/0126699 A1 | 5/2008 | Sangapu et al. |
| 2008/0140883 A1 | 6/2008 | Salessi et al. |
| 2008/0140905 A1 | 6/2008 | Okuyama et al. |
| 2009/0077140 A1 | 3/2009 | Anglin et al. |
| 2009/0222632 A1 | 9/2009 | Sasage et al. |
| 2009/0228889 A1 | 9/2009 | Yoshida |
| 2009/0249470 A1 | 10/2009 | Litvin et al. |
| 2010/0037009 A1 | 2/2010 | Yano et al. |
| 2010/0070725 A1 | 3/2010 | Prahlad et al. |
| 2010/0191922 A1 | 7/2010 | Dickey et al. |
| 2010/0312983 A1 | 12/2010 | Moon et al. |
| 2011/0016450 A1 | 1/2011 | Karadakal |
| 2011/0191554 A1 | 8/2011 | Sakai et al. |
| 2012/0030318 A1 | 2/2012 | Ryder |
| 2012/0030343 A1 | 2/2012 | Ryder |
| 2012/0079221 A1 | 3/2012 | Sivasubramanian et al. |
| 2012/0079505 A1 | 3/2012 | Tarta et al. |
| 2012/0215835 A1 | 8/2012 | Takano et al. |
| 2012/0246511 A1 | 9/2012 | Sato |
| 2012/0254687 A1 | 10/2012 | Leggette et al. |
| 2012/0303576 A1 | 11/2012 | Calder et al. |
| 2013/0007753 A1 | 1/2013 | Jain |
| 2013/0036091 A1 | 2/2013 | Provenzano et al. |
| 2013/0046966 A1 | 2/2013 | Chu et al. |
| 2013/0054890 A1 | 2/2013 | Desai et al. |
| 2013/0055248 A1 | 2/2013 | Sokolinski et al. |
| 2013/0086585 A1 | 4/2013 | Huang et al. |
| 2013/0104126 A1 | 4/2013 | Padmanabhuni et al. |
| 2013/0198459 A1 | 8/2013 | Joshi et al. |
| 2013/0254590 A1* | 9/2013 | Chercoles Sanchez ..................... |
| | | G06F 11/2094 |
| | | 714/6.1 |
| 2013/0268575 A1 | 10/2013 | Xu |
| 2013/0304903 A1 | 11/2013 | Mick et al. |
| 2013/0311513 A1* | 11/2013 | Piedmonte ............ G06F 16/278 |
| | | 707/E17.014 |
| 2014/0115287 A1 | 4/2014 | Schnapp et al. |
| 2014/0136482 A1 | 5/2014 | Rochette |
| 2014/0181046 A1 | 6/2014 | Pawar et al. |
| 2014/0280441 A1 | 9/2014 | Jacobson et al. |
| 2014/0351636 A1 | 11/2014 | Yin et al. |
| 2014/0359130 A1 | 12/2014 | Southern et al. |
| 2015/0128053 A1 | 5/2015 | Bragstad et al. |
| 2015/0134615 A1 | 5/2015 | Goodman et al. |
| 2015/0134723 A1 | 5/2015 | Kansal et al. |
| 2015/0139168 A1 | 5/2015 | Zhi et al. |
| 2015/0160885 A1 | 6/2015 | Hara et al. |
| 2015/0286432 A1 | 10/2015 | Dain et al. |
| 2015/0370483 A1 | 12/2015 | Schoebel-Theuer |
| 2016/0026395 A1 | 1/2016 | Lee |
| 2016/0036938 A1 | 2/2016 | Aviles et al. |
| 2016/0085651 A1 | 3/2016 | Factor et al. |
| 2016/0224244 A1 | 8/2016 | Gensler, Jr. et al. |
| 2016/0291889 A1 | 10/2016 | Dawson et al. |
| 2017/0024764 A1 | 1/2017 | Mooser et al. |
| 2017/0078383 A1* | 3/2017 | Murstein ............... G06F 16/183 |
| 2017/0147243 A1 | 5/2017 | Kowalski et al. |
| 2017/0192857 A1 | 7/2017 | Meiri et al. |
| 2017/0222935 A1 | 8/2017 | Kalman et al. |
| 2017/0237809 A1 | 8/2017 | Farinacci et al. |
| 2017/0329528 A1 | 11/2017 | Wei et al. |
| 2018/0173874 A1 | 6/2018 | Muttik et al. |
| 2018/0322017 A1* | 11/2018 | Maccanti ............ G06F 11/1458 |
| 2018/0329935 A1 | 11/2018 | Mugali et al. |
| 2018/0359336 A1 | 12/2018 | Chattopadhyay et al. |
| 2019/0042636 A1 | 2/2019 | Sipka et al. |
| 2019/0332268 A1 | 10/2019 | Greenwood et al. |
| 2019/0332269 A1 | 10/2019 | Greenwood et al. |
| 2019/0347352 A1 | 11/2019 | Gochkov et al. |
| 2020/0142596 A1 | 5/2020 | Greenwood et al. |
| 2020/0192761 A1* | 6/2020 | Ponce .................. G06F 11/1464 |
| 2020/0285542 A1* | 9/2020 | Deshpande ......... G06F 11/1451 |
| 2021/0124652 A1* | 4/2021 | Srinivasan .......... G06F 11/1469 |

FOREIGN PATENT DOCUMENTS

| | | |
|---|---|---|
| EP | 3788466 A1 | 3/2021 |
| IN | 202017046394 | 2/2021 |
| JP | 2021521551 A | 8/2021 |
| KR | 10-2021-0003217 A | 1/2021 |
| WO | 2011088261 A2 | 7/2011 |
| WO | 2017028885 A1 | 2/2017 |
| WO | 2019212768 A1 | 11/2019 |

OTHER PUBLICATIONS

"AWS Amazon Elastic Block Store (EBS)" downloaded Nov. 3, 2023 from https://aws.amazon.com/ebs/?did=ft_card&trk=ft_card, 7 pages.

"Feature Guide: Elastic Block Store: Articles & Tutorials: Amazon Web Services," Aug. 20, 2008, downloaded Nov. 3, 2023 from aws.amazon.com/articles/1667, 11 pages.

Hyser, et al, "Autonomic Virtual Machine placement in the Data Center," Hewlett Packard Laboratories, HPL-2007-189, Dec. 11, 2007, 11 pages.

International Search Report and Written Opinion mailed Jul. 11, 2019, Patent Application No. PCT/US2019/028320, 3 pages.

Reich, et al, "VMTorrent: Scalable P2P Virtual Machine Streaming," Dec. 10, 2012, 12 pages.

(56) References Cited

OTHER PUBLICATIONS

Waldspurger, "Memory Resource Management in VMware ESX Server," Proc. Fifth Symposium on Operating Systems Design and Implementation (OSDI'02), Dec. 10, 2002, 14 pages.

\* cited by examiner

US 12,380,000 B1

DATABASE TABLE RESTORATION FOR DATA WITH SKEWED DISTRIBUTION

BACKGROUND

Distributed database management system are called upon to store large quantities of data in a scalable and efficient way. The efficiency, scalability, and reliability of these systems may be enhanced by using various partitions, or divisions, of the collections of data that these systems maintain. However, the maintenance and restoration of backups of distributed database remains challenging.

BRIEF DESCRIPTION OF THE DRAWINGS

Various techniques will be described with reference to the drawings, in which.

DETAILED DESCRIPTION

Figure 1:
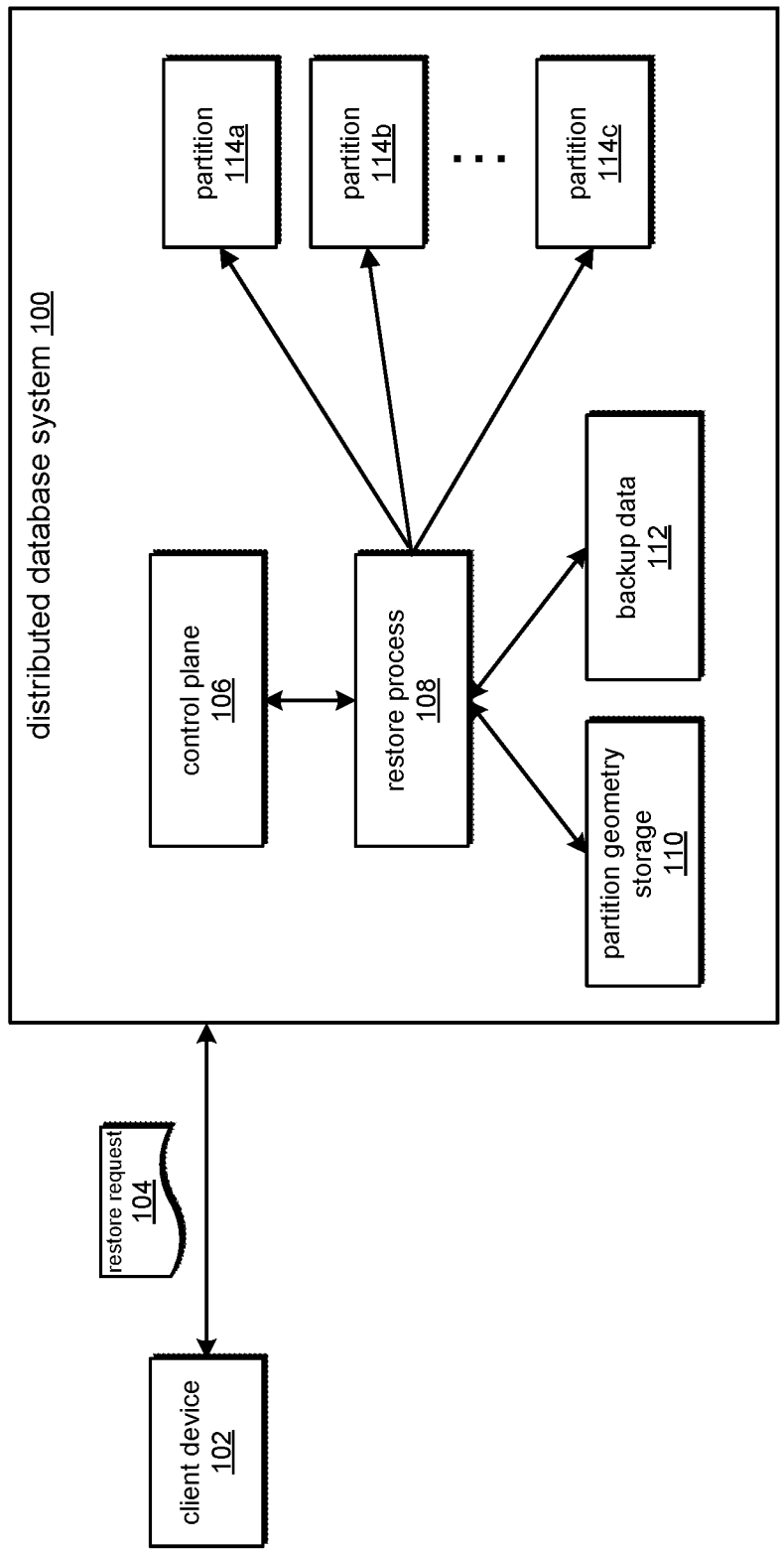
FIG. 1 illustrates a distributed database system with determinative table restoration times, in accordance with at least one embodiment.

In an example of a distributed database system, a backup and restoration process is implemented according to techniques described herein. In this example, a distributed database system comprises a number of partitions of a database table hosted on a number of corresponding computing nodes. The distributed database system makes periodic backups of the partitioned table. When called upon to restore the table, the distributed database system determines if any of data in any one of the existing partitions would take longer than a goal time to restore. If so, the partition geometry is readjusted by recursively splitting this partition until the estimated restore times of the split are less than the goal. The table is then restored, in under the goal time, according to this adjusted partition geometry.

In an example of a distributed database management system, the system comprises a computing device on which a restoration process is executed in order to restore a partitioned database table. The computing device comprises at least one processor and a memory comprising instructions that, in response to execution by the at least one processor, cause the system to perform operations to restore the database table. The operations, in this example, comprise obtaining, from a backup the database table's partitions, information which describes the key ranges associated with the partitions. The computing device then determines a size of data associated with one of the partitions, and determines that the size of data in that partition indicates that the backup restoration time would exceed a predefined maximum. The computing device splits the partition's key ranges such that the resulting partitions would have respective sizes indicating that the backup restoration time would be less than the maximum restoration time. The computing device then causes the database table to be restored to a second plurality of partitions of the database table, wherein the second plurality of partitions comprises the two or more additional partitions.

In an aspect of this example, the computing device estimates the backup restoration time based on the size of the partition and the write capacity of a storage device or computing node that will store the partition.

In another aspect of this example, the distributed database receives a request to restore the database to a particular point-in-time. The computing device of the system obtains key range information associated with the table's partitions, such that the information corresponds to key ranges in effect as of the point-in-time. The system further determines the size of the partition corresponding to the size of the partition as of the point-in-time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including that embodiments disclosed herein provide improved control over restoration times of partitioned database tables.

Figure 2:
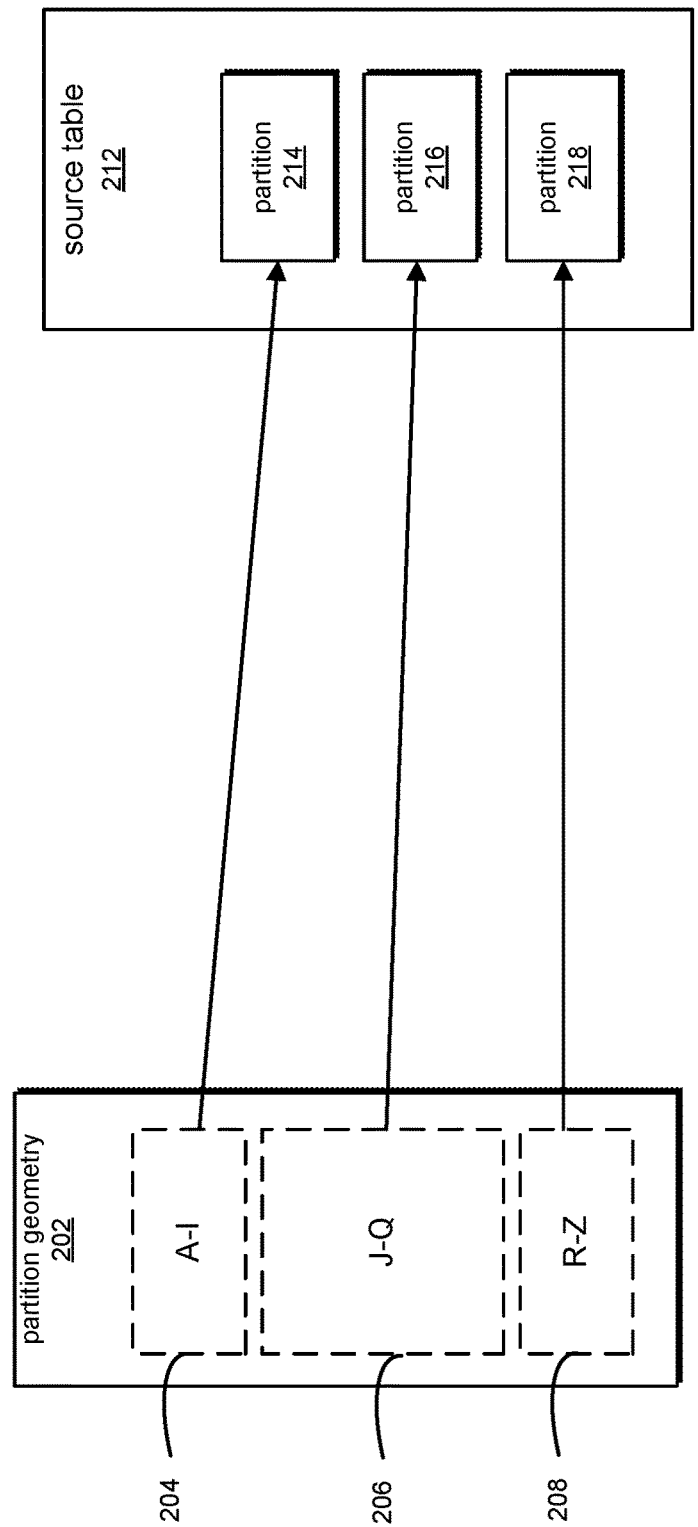
FIG. 2 illustrates an example of partition geometry for a partitioned database table with skewed data distribution, in accordance with at least one embodiment.
Figure 3:
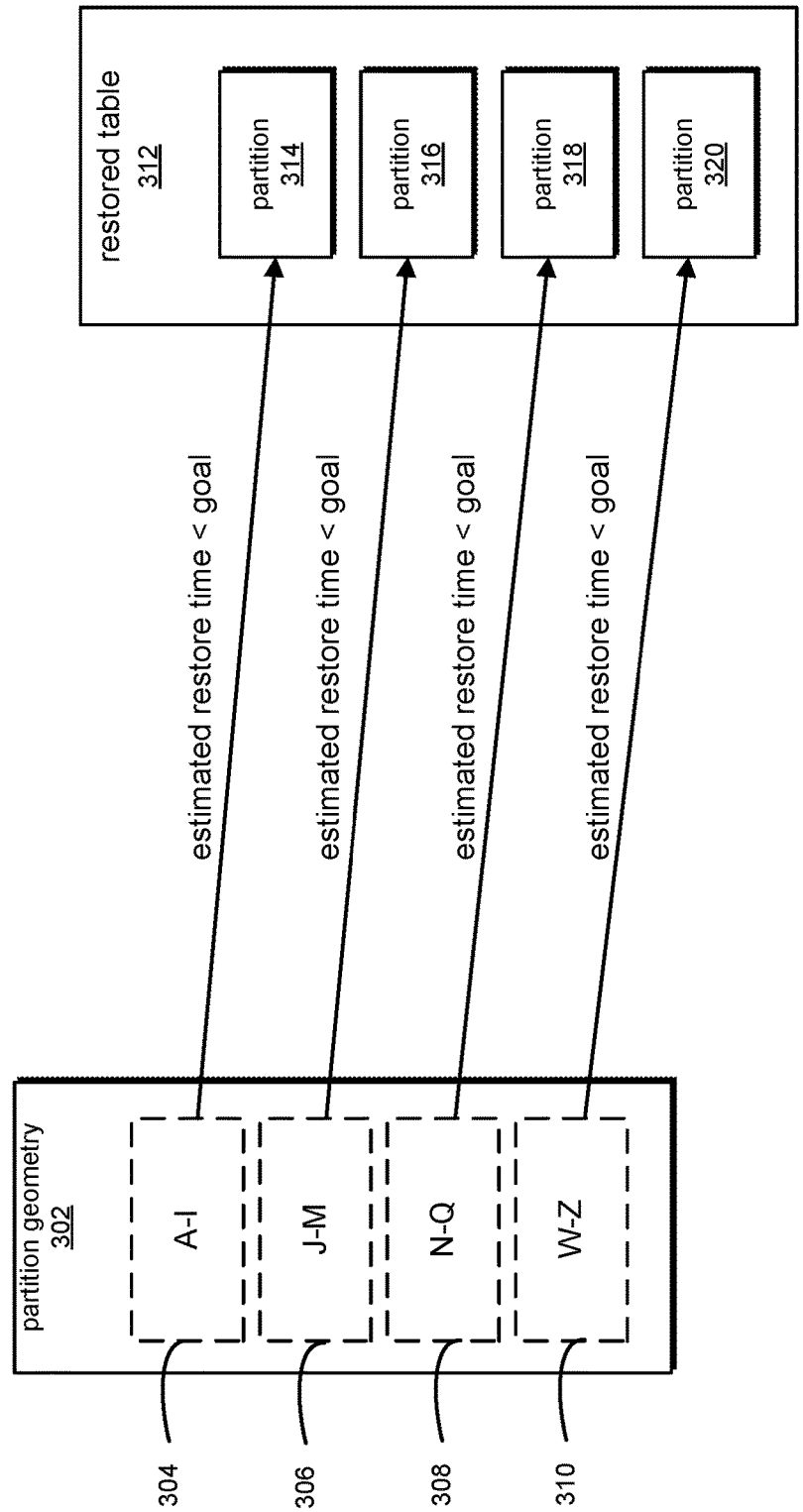
FIG. 3 illustrates an example of partition geometry for partitioned database table whose partitions have been redefined to control restoration time, in accordance with at least one embodiment.

FIG. 1 illustrates a distributed database system with determinative table restoration times, in accordance with at least one embodiment. In the example of FIG. 1, a distributed database system 100 restores a database table to a plurality of storage devices or computing nodes that host partitions 114a-c of the data. It may be presumed, for the illustrative purposes of the example, that the database table was partitioned using a partition geometry similar to what is illustrated by the example of FIG. 2, and is to be restored data associated with the one or more partitions 114a-c, whose partition geometry may be considered, for illustrative and explanatory purposes, to be similar to what is illustrated by the example of FIG. 3.

A database table comprises a collection of data items in which each data item is identified by a key. A data item comprises one or more values, examples of which could include names, addresses, phone numbers, and so forth. A key is one or more values that serve to identify the data item. For example, a key might comprise a customer identification number, a combination of first name and last name, and so on. Examples of database tables include relational database tables organized by rows and columns, unstructured or semi-structures collections of key-value pairs, and so forth. It will be appreciated that these examples are intended to be illustrative, and should not be construed as limiting potential embodiments to only those examples that incorporate the specific examples provided.

A partition defines a portion of a database table. A partition is associated with a range of key values, or in some cases and embodiments with a range of hash values derived from key values. For example, in a database table whose keys corresponds to a customer identification number whose possible values range from 1-100, a first partition of the database table might be associated with values 1-50, and a second partition of the database table might be associated with the values 51-100. This scheme may sometimes be referred to as the partition geometry, or as partition key ranges, partitioning scheme, partition key values, and so on.

Data associated with a partition, in at least one embodiment, is stored on a storage device. The storage device may comprise mechanical or solid-state disk drives, for example. In at least one embodiment, the storage device is a component of a computing device, such as a computing server. In at least one embodiment, the storage device is part of a scalable storage service, in which data storage capability is provided at scale by a provider of hosted computing services. A storage device on which partition data is stored may be associated with a computing node. The computing node and storage device may be said to host the partition, or more specifically to host the data belonging to the partition. The computing node, in at least one embodiment, processes requests to store or retrieve data belonging to the partition, and the storage device performs the underlying storage and retrieval operations.

In at least one embodiment, distributed database system 100 comprises a control plane 106. The control plane 100 may comprise a component or software module which executes on a computing device of the distributed database system 100. The control plane 100, in at least one embodiment, coordinates activities of the distributed database system 100, including but not necessarily limited to activities related to the generation of backup data and the restoration of backup data. In at least one embodiment, the control plane 106 facilitates execution of steps used to restore a partitioned database table according to a new set of partitions.

In at least one embodiment, a client device 102 sends a restoration request 104 to the distributed database system 100. The client device 102 may comprise a computing device, such as a personal computer, smartphone, tablet, or computer server. In some cases and embodiments, the client device 102 is a component of a hosted computing service. For example, a hosted computing service may provide a user interface through which the restore request 104 can be initiated.

The restoration request 104 may comprise an electronic message which indicates that a distributed database table should be restored. Here, a partitioned database table refers to a database table that has been divided according to one or more partitions, according to the partition's geometry, and stored on one or more corresponding storage devices.

The restoration request 104 may comprise an indication of the table that is to be restored from backup data 112. As used herein, a backup of a database table refers to one or more files, or other storage units, from which the data of the table may be obtained. In at least one embodiment, a backup comprises a snapshot of the database table's data as of a particular point-in-time. In other embodiments, a backup comprises log files applicable to the database table, in which each transaction that has been applied to the table is recorded. The state of a database table as of a particular point-in-time, in such cases, can be recreated by replaying transactions that were applied to the database table up until that point-in-time.

In at least one embodiment, the restore request 104 is received by the distributed database management system 100. The control plane 106, in some embodiments, performs initial processing of the request and initiates a restore process 108. The restore process 108 comprises software and/or circuitry to perform the operations that comprise a restoration process, such as those described in relation to FIGS. 5-7. The restoration process 108, in at least one embodiment, obtains partition geometry for the database table from a partition geometry storage 110. The restoration process 108, in some embodiments, obtains partition geometry for the database table from the backup data 112. Once the restoration process 108 obtains the partition geometry that was used for the backed-up table, the restoration process 108 can determine a partition geometry to be used for the restored version of table. The backed-up table can be referred to as the source table, and the restored version of the table can be referred to as the target table, or the restored table.

As described herein, the keys of the data stored in the backed-up database table may be skewed to a particular range of keys, and this skewing may result in restoration times that exceed a predetermined or predefined amount of time. This amount of time may be referred to as the goal time. This can occur if the data is skewed in such a way that a single partition has more data associated with it than can be written to the storage device for that partition in the allowed time. For example, if a partition has 1,000,000 MB of data, and the data can be stored on the storage device at 500 MB/second, the time needed to store the partition's data on the storage device can be estimated to be 2,000 seconds, or approximately 33.3 minutes. Each of a table's partitions may be written in parallel. As such, the total time required to restore a table can correspond to the time needed to restore the largest partition. In this example, if the largest partition has 1,000,000 MB of data, the time needed to restore the table would be approximately 33.3 minutes. If this exceeds the maximum time permitted by the goal for table restoration (for example, the goal time might be set for 20 minutes), the restore process 108 can compute a partition geometry for the restored table in which the restore time for the data associated with each individual partition is estimated to be less than the goal time. For example, the original partition with 1,000,000 MB of associated data can be split into two partitions associated with 500,000 MB each, so that each of the individual partitions take approximately 17.7 minutes to restore.

FIG. 2 illustrates an example of partition geometry for a partitioned database table with skewed data distribution, in accordance with at least one embodiment. In the example 200 of FIG. 2, a partition geometry 202 maps key ranges 204, 206, 208 to corresponding partitions 214, 216, 218. A first key range 204 maps to data items in the source table 212 whose keys begin with the letters A-I. These data items are stored in a corresponding first partition 214 of source table 212. Note that the term partition of a source table, as used in FIGS. 2 and 3, may refer to data of source table 212 that is associated with a partition. A second key range 206 maps to data items in the source table 212 whose keys begin with the letters J-Q. These data items are stored in a corresponding second partition 216 of source table 212. Finally, a third key range 208 maps to data items in the source table 212 whose keys begin with the letters J-Q, and these data items are stored in a corresponding third partition 218 of source table 212. The partition geometry 202, comprising definitions of the key ranges 204, 206, 208, might initially be defined based on an estimated distribution of data that would place equal amounts of data in each partition. However, as illustrated in FIG. 2, it might end up being the case that certain partitions, such as the depicted second partition 206, are larger than others. This condition may be described as a skew in the distribution of the data.

In at least one embodiment, each of the partitions 214, 216, 218 is analyzed to determine if the source table 212 could be restored within a predetermined amount of time. Analysis may, for example, be based on the sizes of the partitions 214, 216, 218. In at least one embodiment, the estimated time for restoring the source table 212 is calculated by estimating the time for restoring each of the individual partitions 214, 216, 218, and use the largest of these times as the estimate for restoring the table. The time to restore an individual partition may be calculated, in at least one embodiment, based on the size of the partition and on the write capacity, per unit time, of the partition that the data is to be stored on when the partition is restored.

FIG. 3 illustrates an example of partition geometry for partitioned database table whose partitions have been redefined to control restoration time, in accordance with at least one embodiment. The example 300 depicts a partition geometry 302 that has been derived from the partition geometry 202 that is depicted in FIG. 2. In particular, the second key range 206 of the original partition geometry 202 has been split into two key ranges 306, 308 corresponding to the values J-M and N-Q. Consequently, the new partition geometry 302 has four key ranges 304-310 that will map, once the table is restored, to four corresponding partitions 314-320 in the restored table 312. The new partition geometry 302 is such that none of its corresponding partitions 314-320 take longer to load with data from the source table 212 than is permitted by the goal time.

In at least one embodiment, the time required to restore data to a partition is estimated based, at least partially, on the partition's size. For example, the time required to restore data to a partition can be estimated by dividing the partition's size by the write capacity, per unit of time, of the computing node on which the partition will be stored.

In at least one embodiment, the time required to restore data to a partition is estimated based, at least partially, on the number of data items in the partition. For example, an estimated time may be based on the number of key-value pairs to be stored in the partition, based on the partitions associated key range. In at least one embodiment, the estimated time is based on the number of rows to be stored in the partition.

In at least one embodiment, the time required to restore data to a partition is estimated based, at least in part, on the number of transactions needed to restore the data. For example, the backup of the partition may be stored as log file in which transaction performed on the source table 212 are stored. To restore the table, the transactions are replayed on the table 312 and its partitions 314-320, and data stored as a consequence of the transactions is stored in the appropriate on of the partitions 314-320. Consequently, time to restore data to a particular partition, in this case, can be determined by analyzing the transactions and determining how many would apply to that partition.

In at least one embodiment, the new partition geometry is calculated using partition size information obtained from backup files. For example, in at least one embodiment, partition data is stored as a set of one or more files, and the size of the partition can be estimated from the size of the files.

In at least one embodiment, the new partition geometry is calculated using partition size information obtained from the storage devices on which the partition is stored. For example, in at least one embodiment, each partition is stored on a computing node with an attached storage device, and the size of data stored on the device is periodically observed and recorded.

Figure 4:
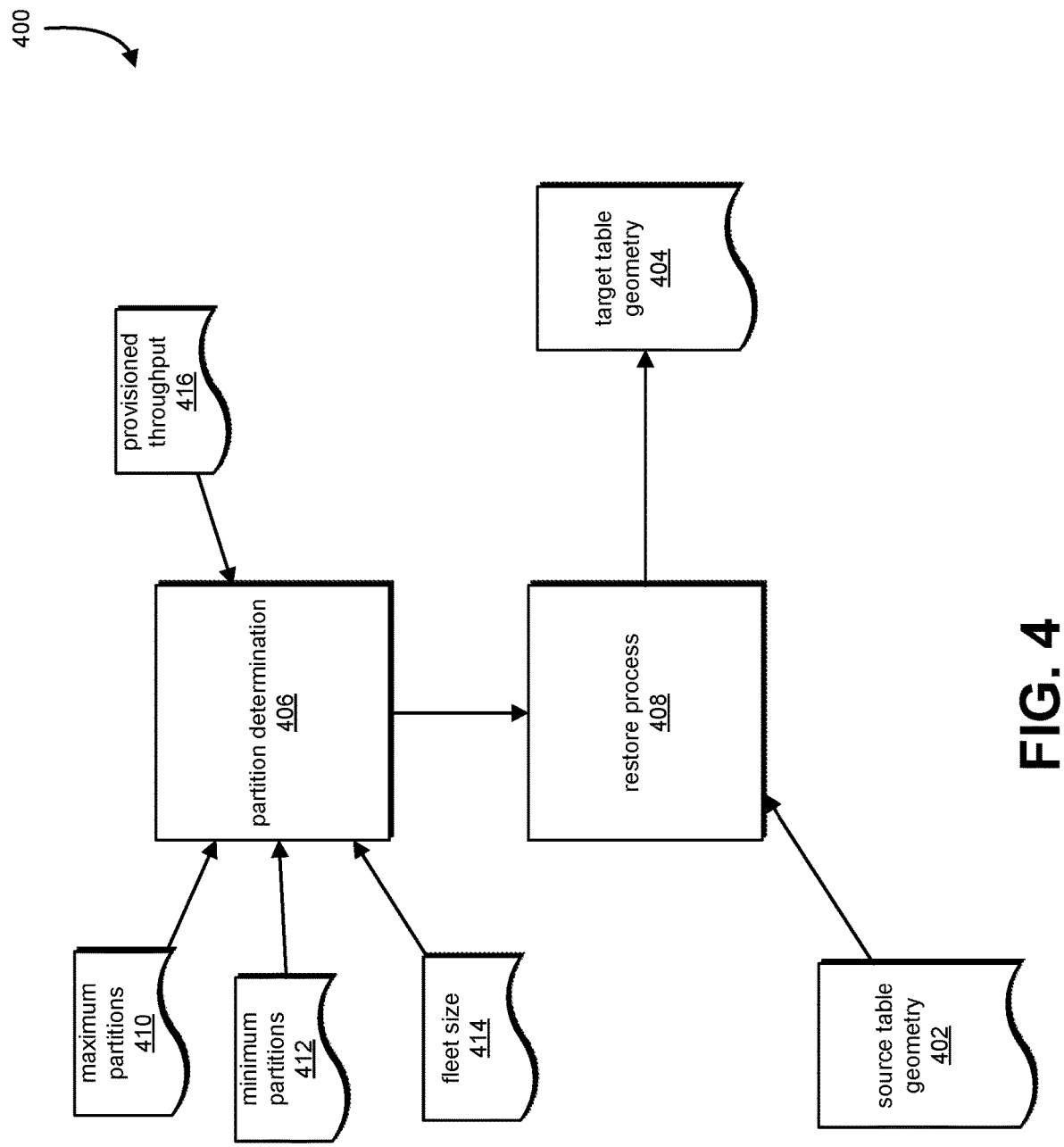
FIG. 4 illustrates an example of components of a distributed database for calculating partition geometry, in accordance with at least one embodiment.

Computation of partition geometry can be further understood in view of FIG. 4, which illustrates an example of components of a distributed database for calculating partition geometry, in accordance with at least one embodiment. In the example 400, a restore process 408 computes a partition geometry for a partitioned database table that is to be restored from backup. The partition geometry is computed by the restore process 408 so that the restore time of any individual partition, in the new geometry, is less than the goal time for the table restoration. The restore process 408 in FIG. 4 may correspond to the restore process 108 depicted in FIG. 1 and further described with respect to FIGS. 2-3.

In at least one embodiment, calculation of partition geometry is constrained by one or more factors associated with a partition determination process 406. In FIG. 4, partition determination 406 refers to one or more system components that are responsible for allocating storage devices or computing nodes on which partition information is to be stored, to one or more system components that are responsible for operating these storage devices or computing nodes, one or more system components responsible for managing usage of system components, and so forth. These components may impose various constraints, which may include but are not necessarily limited to constraints on maximum partitions 410, minimum partitions 412, fleet size 414, and provisioned throughput 416.

Constraints on minimum partitions 412 and maximum partitions 410 may arise from factors which may include optimizing utilization of available storage, optimizing processor utilization, hardware maintenance costs, avoiding over-utilization of computing resources, and so forth.

Constrains on fleet size 414 may be based on similar factors. In addition, in at least one embodiment, pools of available resources have limited capacity, and as a result the number of storage devices or computing nodes available for storing or maintaining partitions may be limited.

In at least one embodiment, the restore process 408 comprises software instructions and/or circuitry to perform computations to identify key ranges which will result in partitions that can likely be restored in less than the goal time. The restore process 408 may take a source table geometry 402 which would result in an overly lengthy restoration time and transform the geometry, to a target table geometry 404, that may be restored more quickly. The calculator of the partition geometry may proceed by identifying a partition whose restore time would exceed the goal time and then splitting that partition. This can then be repeated until all partitions are likely to be restorable in the goal time.

When a partition is split, the key-range location of the split may be referred to as the split point. In at least one embodiment, the split point is determined by identifying the halfway point of the related key range. For example, if the original key range was A-D, the two new key ranges might be A-B and C-D. However, this may still result in partitions that may be skewed, since it could be the case that most of the data has keys that reside within one of the two new ranges. In at least one embodiment, a sampling technique is applied to data in the partition in order to identify a more optimal split point. For example, in at least one embodiment, every $N^{th}$ record is sampled to estimate a distribution of keys within the partition, and the partition is divided based on this. In the aforementioned case, if the estimated distribution was 500,000 MB of data items having 'A' keys, and 500,000 MB of data items having 'B'-'D' keys, then the new key ranges could be A and B-D. This process could continue until each key range maps to a partition of sufficiently small size.

In at least one embodiment, constraints on the number of available partitions may limit the total number of partitions which may be used. Splitting certain partitions may therefore cause this limit to be exceeded. To meet these constraints, other partitions may be combined. For example, in at least one embodiment, two or more of the smallest partitions are selected and their corresponding key ranges combined. When the restore process 408 loads the table's data according to these new ranges, the merged partition encompasses data from the combined range. In at least one embodiment, estimated time for restoring the combined partition is based on the respective restore times of the original partitions. In some instances, partitions are selected for merging based on the estimated restore time for the combined partition being less than the goal time. For example, a small partition might be combined with a somewhat larger partition if the estimated restore time for a combined partition is less than the goal time.

The total number of partitions may also, in at least some embodiments, be constrained based on limits on provisioned throughput 416. Provisioned throughput may refer to compute capacity consumed to perform database operations. This can include, for example, the amount of data that may be read or written per unit time. Where there are large numbers of partitions, these limits might be exceeded. This might occur during restoration, or during regular operation of the database. For example, some operations (such as replication) might consume increasing amounts of capacity as the number of partitions increases.

Similarly, the system may impose constraints on the number of partitions in view of desired ranges of read or write capacity that will be utilized on the computing nodes that host the partitions. Within a particular key range, the system may predict expected read or write consumption and determine if the expected consumption would fall outside of a desired range. For example, larger partitions may be expected to consume greater amounts of read or write capacity than smaller partitions. Accordingly, partitions may be split or merged so that their read or write capacity utilization falls within desired ranges.

Figure 5:
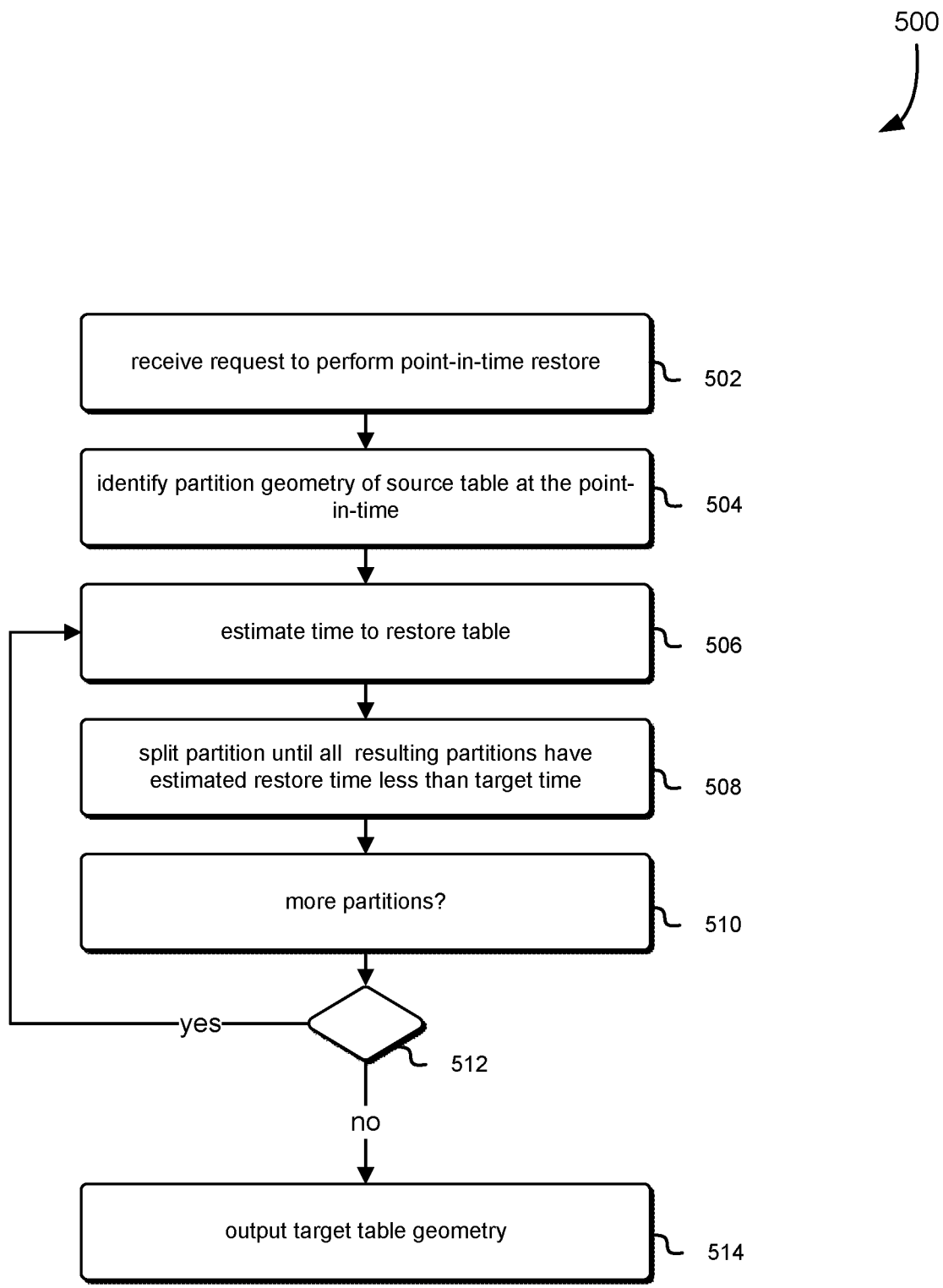
FIG. 5 illustrates an example process of restoring a database table to a point-in-time, in accordance with at least one embodiment.

FIG. 5 illustrates an example process 500 of restoring a database table, in accordance with at least one embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In at least one embodiment, the steps depicted in relation to FIG. 5 are performed by a distributed database system, such as the distributed database system 100 depicted in FIG. 1. In some cases, some or all of the steps depicted in relation to FIG. 5 are performed by a control plane and/or a computing node which hosts a restoration process, such as the restoration process 108 depicted in FIG. 1. In some cases, certain preparatory steps, such as obtaining information, or performed or facilitated by other components of a distributed database system.

At 502, the distributed database system receives a request to perform a point-in-time restoration of a partitioned table. The point-in-time refers to a time in the operation of the source table. The target table, upon its restoration, will be restored to a state that is equivalent to the state of the source table as of the point-in-time. Here, state refers to the contents of the table, but not to the partitioning geometry, since the partition geometry is to be recalculated and the table's data stored on a different combination of partitions.

At 504, the distributed database system identifies the partition geometry of the source table as of the point-in-time. In at least one embodiment, the distributed database system attempts to identify the partition geometry of the source table at a time near the point-in-time. For example, in some cases, a time shortly before or after the point in time may be used, without necessarily compromising results, since skew in data distribution may occur slowly over time.

In at least one embodiment, the partition geometry of the source table is obtained from a backup of the source table. For example, a control plane or restore process such as is depicted in FIG. 1 may locate the file or files that comprise a materialized backup, and examine the files to identify the partition geometry. In some cases, this may be obtained from metadata that is stored with the backup and that identifies the key ranges. In other cases, the geometry may be determined by analyzing the backup files to determine which keys were assigned to which partitions in the source table.

At 506, the distributed database system estimates the time required to restore the source table to a target table. As described herein, the estimated time may be determined based on the size of each partition in the source table and the capacity of each partition's corresponding device or compute node to process the data.

At 508, the distributed database system splits a partition until all of the resulting partitions have an estimated restore time that is less than the target time. As described herein, this may be done by identifying a split point in the key range of a partition, and generating new partitions based on the split point.

At 510, the distributed database system determines if there are more partitions to analyze, and if so, at 512, the process repeats at step 506. Otherwise, the distributed database system, at 514, outputs a target table geometry.

Figure 6:
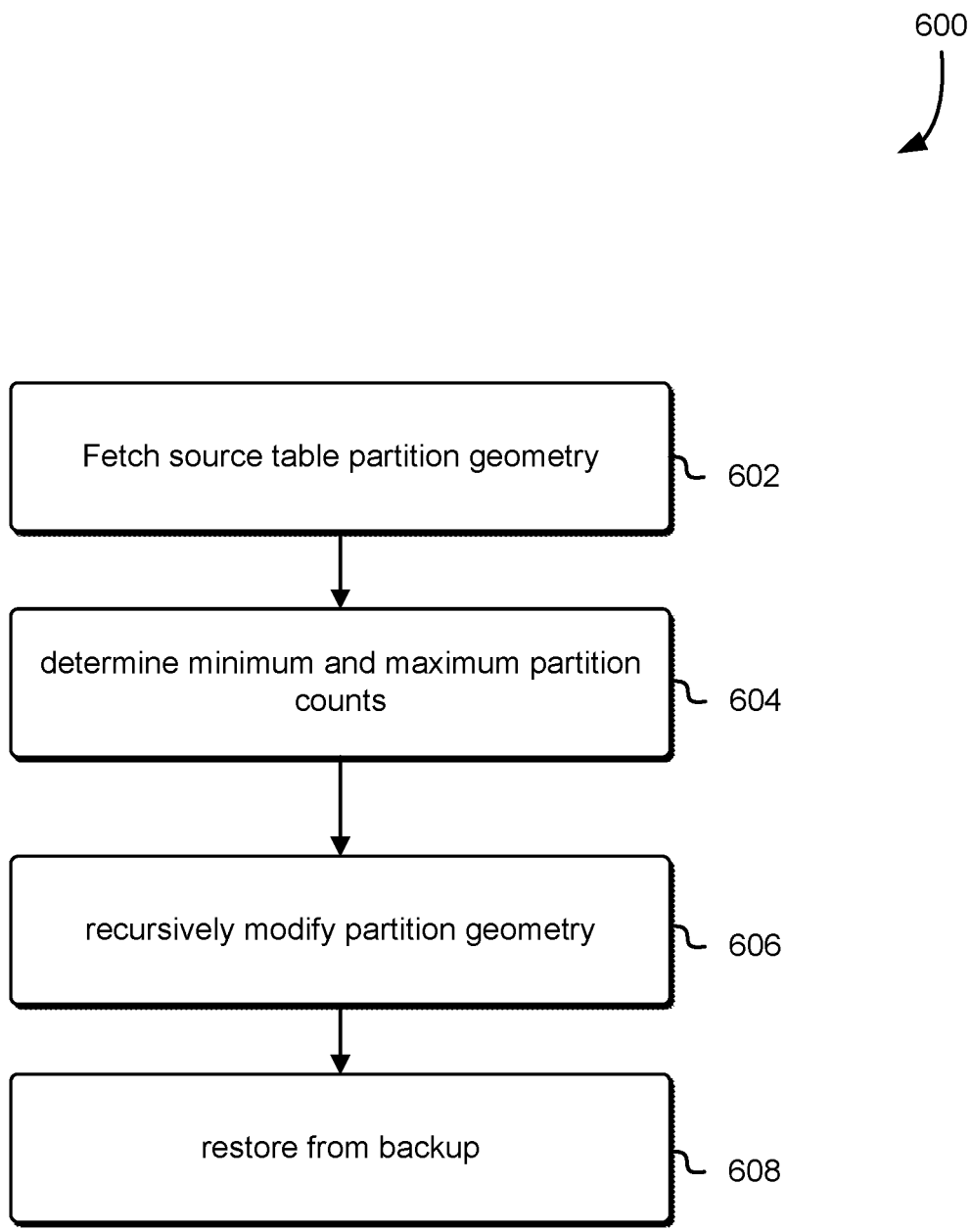
FIG. 6 illustrates an example process of restoring a database table, in accordance with at least one embodiment.

FIG. 6 illustrates an example process 600 of restoring a database table, in accordance with at least one embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

In at least one embodiment, the steps depicted in relation to FIG. 6 are performed by a distributed database system, such as the distributed database system 100 depicted in FIG. 1. In some cases, some or all of the steps depicted in relation to FIG. 6 are performed by a control plane and/or a computing node which hosts a restoration process, such as the restoration process 108 depicted in FIG. 1. In some cases, certain preparatory steps, such as obtaining information, or performed or facilitated by other components of a distributed database system.

At 602, the distributed database fetches the source table partition geometry. In at least one embodiment, the source table partition geometry comprises key range information, and in some cases may also comprise mappings between key ranges and partitions in the source table, or between key ranges and data files in a backup of the source table.

At 604, the distributed database, determines minimum and maximum partition counts.

These may be based, at least partially, on constraints to the number of storage devices or computing nodes that might store or host the partitions, or to other operational constraints. FIG. 4 describes various further examples of these determinations.

At 606, the distributed database recursively modifies the partition geometry. In at least one embodiment, the recursive modification comprises splitting partitions whose restore times would otherwise exceed a goal time, subject to the minimum and maximum partition constraints determined At 608, the distributed database restores the source table to a target table. In at least one embodiment, this comprises a number of operations, which may include allocating computing nodes or storage devices to maintain the target number of partition, performing installation procedures to enable database management operations to be performed on the storage device or computing nodes that is to host each partition, and causing the data from the source table to be stored on the appropriate partition. In at least one embodiment, storing the data from the source table on the appropriate target partitions comprises identifying which partition should store a data item based on that item's key, and causing the identified partition to store the data.

In an example embodiment, a computer-implemented method for restoring a partitioned database table comprises obtaining information indicative of key ranges of associated with a first plurality of partitions of a database table, where the database table is to be restored according to a second plurality of partitions of the database table. The example method further comprises determining that restoration of one of the partitions of the first plurality of partitions is likely to take time that exceeds a maximum restoration time. In response, the method comprises splitting that partition into two or more additional partitions, so that the respective estimated restoration times for data associated with the two or more additional partitions are estimated to be less than the maximum restoration time. The method further comprises causing the database table to be restored according to a second plurality of partitions that comprises the two or more additional partitions.

In an aspect of this example, information describing key ranges associated with the first plurality of partitions is obtained from a backup of the database table.

In a further aspect of this example, the computer-implemented method further comprises estimating time to restore the partition based at least in part on write capacity of a storage device to store the partition upon restoration of the backup.

In a further aspect of this example, the computer-implemented method further comprises estimating time to restore the partition based at least in part on a size of the partition.

In a further aspect of this example, the computer-implemented method further comprises obtaining information indicative of the size of the partition from one or more files of a backup of the partition.

In a further aspect of this example, the computer-implemented method further comprises obtaining information indicative of the size of the partition from a storage device on which the partition is stored.

In a further aspect of this example, the information indicative of key ranges associated with the first plurality of partitions corresponds to key ranges in effect as of a point-in-time associated with a requested restoration of the table.

In a further aspect of this example, the computer-implemented method further comprises estimating the time that will be needed to restore the partition based at least in part on data stored in the table at a point-in-time associated with a requested restoration of the table.

Any of these various aspects of the aforementioned computer-implemented method may be combined, in any combination, to produce additional embodiments.

In an example embodiment, a non-transitory computer-readable storage medium has stored thereon executable instructions that, as a result of being executed by one or more processors of a computer system, cause the computer system to at least determine key ranges associated with a first plurality of partitions of a database table, where the database table is to be restored according to a second plurality of partitions. The instructions, as a result of being executed, further cause the computing system to determine that restoration of a partition of the first plurality of partitions of the database table is likely to take more time than a goal restoration time, and divide the partition into two or more additional partitions, where the respective estimated restoration times for data associated with the additional partitions is estimated to be less than the goal time. The computer system then executes instructions which cause it to initiate restoration of the database table to the second plurality of partitions, wherein the second plurality of partitions comprises the two or more additional partitions.

In an aspect of this example, the computer-readable storage medium comprises additional instructions that, as a result of being executed, cause the computer system to at least obtain the information indicative of key ranges associated with the first plurality of partitions from a backup of the database table.

In a further aspect of this example, the computer-readable storage medium comprises additional instructions that, as a result of being executed, cause the computer system to at least estimate time to restore the partition based at least in part on write capacity of a storage device to store the partition upon restoration of the backup, and based at least in part on a size of the partition.

In a further aspect of this example, a size of the partition is determined based, at least in part, on one or more files of a backup of the partition.

In a further aspect of this example, the information describing key ranges associated with the first plurality of partitions corresponds to key ranges in effect as of a point-in-time associated with a requested restoration of the table.

In an aspect of this example, the computer-readable storage medium comprises additional instructions that, as a result of being executed, cause the computer system to at least estimate time to restore the partition based at least in part on data stored in the table at a point-in-time associated with a requested restoration of the table.

In an aspect of this example, the partition is recursively divided into additional partitions until respective sizes of data associated with the additional partitions are indicative of a restoration time estimated to be less than the goal restoration time.

Any of these various aspects of the aforementioned computer-implemented method may be combined, in any combination, to produce additional embodiments.

Figure 7:
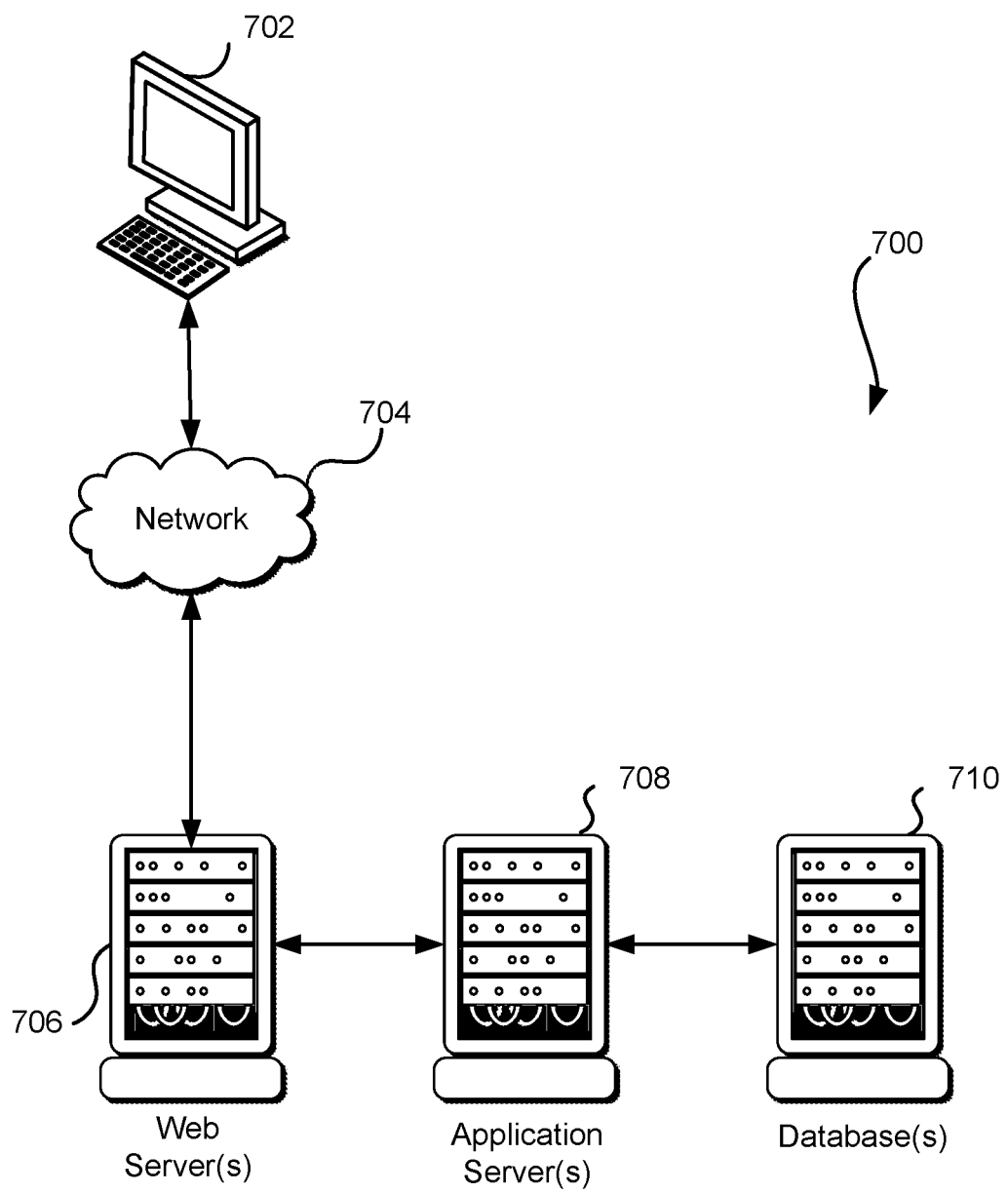
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and one or more databases 710, and it should be understood that there can be several application servers, layers or other elements, processes or components, which may be chained or otherwise configured, which can interact to perform tasks such as obtaining data from an appropriate database. The application server(s) 708 and database(s) may be operative on one or more servers. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database(s) 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The database(s) 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

The database(s) 710, in an embodiment, comprise one or more journaled database management systems, such as the journaled database management system depicted in FIG. 1. A journaled database management system may, in at least some embodiments, be a distributed system operative on a plurality of servers. In other embodiments, a journaled database management system is operative on one server.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising instructions that, in response to execution by the at least one processor, cause the system to at least:
   obtain, from a backup of a database table, information indicative of key ranges associated with a first plurality of partitions of the database table hosted on a plurality of corresponding computing nodes;
   determine a size of data associated with a partition of the first plurality of partitions of the database table;
   estimate a duration required to restore data associated with the partition;
   split, in response to a determination that the duration to restore the data associated with the partition is estimated to exceed a goal duration, the partition into two or more additional partitions until an estimated restore duration of the two or more additional partitions is less than the goal duration, wherein each of the two or more additional partitions are hosted on additional corresponding computing nodes, wherein the partition is split by at least mapping the key ranges associated with the first plurality of partitions to the two or more additional partitions; and
   cause the database table to be restored according to a second plurality of partitions of the database table, wherein the second plurality of partitions comprises the two or more additional partitions.

2. The system of claim 1, the memory comprising further instructions that, in response to execution by the at least one processor, cause the system to at least:
   estimate the restore duration based at least in part on a write capacity of a storage device to store the data associated with the partition, and based at least in part on a size of the data associated with the partition.

3. The system of claim 1, wherein the backup of the database table comprises one or more snapshots storing the data associated with the partition.

4. The system of claim 1, the memory comprising further instructions that, in response to execution by the at least one processor, cause the system to at least:
   obtain information indicative of a point-in-time for restoring the database table;
   obtain the information indicative of key ranges associated with the first plurality of partitions, such that the information corresponds to key ranges in effect as of the point-in-time; and
   determine the size of data associated with the partition as of the point-in-time.

5. The system of claim 1, the memory comprising further instructions that, in response to execution by the at least one processor, cause the system to at least:
   determine that a total number of partitions would exceed a maximum number of partitions; and
   combine two or more additional partitions into one combined partition, wherein the second plurality of partitions comprises the combined partition.

6. A computer-implemented method, comprising:
   obtaining information indicative of key ranges associated with a first plurality of partitions of a database table hosted on two or more corresponding nodes, the database table to be restored according to a second plurality of partitions;
   determining that restoration of data associated with a partition of the first plurality of partitions of the database table is estimated to take an amount of time that exceeds a goal duration;
   in response to the determination, splitting the partition into two or more additional partitions until respective estimated restoration duration for data associated with the two or more additional partitions is estimated to be less than the goal duration, wherein each of the two or more additional partitions are hosted on additional corresponding nodes, wherein splitting the partition comprises mapping the key ranges associated with the first plurality of partitions to key ranges associated with the two or more additional partitions; and
   causing the database table to be restored according to the second plurality of partitions of the database table, wherein the second plurality of partitions comprises the two or more additional partitions.

7. The computer-implemented method of claim 6, wherein the information indicative of key ranges associated with the first plurality of partitions is obtained from a backup of the database table.

8. The computer-implemented method of claim 6, further comprising:
   estimating an amount of time to restore the data associated with the partition based at least in part on write capacity of a storage device that is selected to store the data associated with the partition.

9. The computer-implemented method of claim 6, further comprising:
estimating an amount of time to restore the data associated with the partition based at least in part on a size of the data associated with the partition.

10. The computer-implemented method of claim 6, further comprising:
obtaining information indicative of size of the data associated with the partition from one or more files of a backup of the database table.

11. The computer-implemented method of claim 6, further comprising:
obtaining information indicative of a size of the data associated with the partition from a storage device on which the data associated with the partition is stored.

12. The method of claim 6, wherein the information indicative of key ranges associated with the first plurality of partitions corresponds to key ranges in effect as of a point-in-time associated with a requested restoration of the table.

13. The method of claim 6, further comprising: estimating an amount of time to restore the data associated with the partition based at least in part on data stored in the database table at a point-in-time associated with a requested restoration of the table.

14. A non-transitory computer-readable storage medium storing thereon executable instructions that, as a result of being executed by one or more processors of a computer system, cause the computer system to at least:
determine key ranges associated with a first plurality of partitions of a database table hosted on a plurality of corresponding nodes, the database table to be restored according to a second plurality of partitions;
determine that restoration of data associated with a partition of the first plurality of partitions of the database table is estimated to take an amount of time exceeding a goal amount of time;
in response to the determination, divide the partition into two or more additional partitions until respective estimated restoration times for respective data associated with the two or more additional partitions is estimated to be less than the goal amount of time, each of the two or more additional partitions being hosted on additional corresponding nodes, wherein the divided partition comprises an updated mapping of the key ranges to the two or more additional partitions; and
initiate restoration of the database table according to the second plurality of partitions, wherein the second plurality of partitions comprises the two or more additional partitions.

15. The non-transitory computer-readable storage medium of claim 14, the non-transitory computer-readable storage medium storing thereon further executable instructions that, as a result of being execute by the one or more processors, cause the computer system to at least:
obtain information indicative of the key ranges associated with the first plurality of partitions from a backup of the database table.

16. The non-transitory computer-readable storage medium of claim 14, the non-transitory computer-readable storage medium storing thereon further executable instructions that, as a result of being executed by the one or more processors, cause the computer system to at least:
estimate an amount of time to restore the partition based at least in part on write capacity of a storage device to store data associated with the partition upon restoration, and based at least in part on a size of the data associated with the partition.

17. The non-transitory computer-readable storage medium of claim 14, wherein a size of the data associated with the partition is determined based, at least in part, on one or more files of a backup of the partition.

18. The non-transitory computer-readable storage medium of claim 14, wherein the key ranges associated with the first plurality of partitions corresponds to key ranges in effect as of a point-in-time associated with a requested restoration of the table.

19. The non-transitory computer-readable storage medium of claim 14, the non-transitory computer-readable storage medium storing thereon further executable instructions that, as a result of being executed by the one or more processors, cause the computer system to at least:
estimate an amount of time to restore the data associated with the partition based at least in part on data stored in the table at a point-in-time associated with a requested restoration of the table.

20. The non-transitory computer-readable storage medium of claim 14, wherein the partition is recursively divided into additional partitions until respective sizes of data associated with the additional partitions are each indicative of a restoration time estimated to be less than the goal amount of time.

* * * * *